United States Patent
Lee

(10) Patent No.: US 9,626,019 B2
(45) Date of Patent: Apr. 18, 2017

(54) TOUCH PANEL

(71) Applicant: LG INNOTEK CO., LTD., Seoul (KR)

(72) Inventor: Jin Hak Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 14/444,666

(22) Filed: Jul. 28, 2014

(65) Prior Publication Data
US 2015/0085204 A1    Mar. 26, 2015

(30) Foreign Application Priority Data
Sep. 24, 2013 (KR) .................. 10-2013-0113526

(51) Int. Cl.
G06F 3/041 (2006.01)
G06F 3/044 (2006.01)

(52) U.S. Cl.
CPC .............. *G06F 3/041* (2013.01); *G06F 3/044* (2013.01)

(58) Field of Classification Search
None
See application file for complete search history.

(56) References Cited

U.S. PATENT DOCUMENTS

| | | |
|---|---|---|
| 2010/0013784 A1 | 1/2010 | Nashiki et al. |
| 2010/0261010 A1 | 10/2010 | Wei et al. |
| 2011/0157086 A1 | 6/2011 | Ozeki et al. |
| 2011/0279763 A1 | 11/2011 | Cho et al. |
| 2012/0062481 A1* | 3/2012 | Kim et al. ............ 345/173 |
| 2012/0081334 A1 | 4/2012 | Kim et al. |
| 2012/0170283 A1* | 7/2012 | Kobayashi et al. ........ 362/351 |
| 2013/0043116 A1 | 2/2013 | Shih et al. |
| 2013/0082961 A1 | 4/2013 | Wang et al. |
| 2013/0164541 A1* | 6/2013 | Suwa et al. ............ 428/412 |
| 2014/0079917 A1* | 3/2014 | Huang et al. ............ 428/189 |
| 2015/0041303 A1 | 2/2015 | Cao |

FOREIGN PATENT DOCUMENTS

| | | |
|---|---|---|
| CN | 101246406 A | 8/2008 |
| CN | 102662543 A | 9/2012 |

OTHER PUBLICATIONS

European Search Report in European Application No. 14181917.7, dated Jul. 7, 2015.
Office Action dated Jan. 11, 2017 in Chinese Application No. 201410448932.2.

* cited by examiner

*Primary Examiner* — David D Davis
(74) *Attorney, Agent, or Firm* — Saliwanchik, Lloyd & Eisenschenk

(57) ABSTRACT

Disclosed is a touch panel including a cover substrate including an active area and an inactive area, and a printing layer only on the inactive area. The printing layer includes a first printing layer, and a second printing layer to surround the first printing layer. The second printing layer includes a top surface making contact with the top surface of the first printing layer and a lateral side making contact with a lateral side of the first printing layer. The lateral side of the second printing layer has an average inclination angle in a range of about 1.5° to about 2.7° with respect to one surface of the cover substrate.

14 Claims, 17 Drawing Sheets

TOUCH PANEL

CROSS-REFERENCES TO RELATED APPLICATION

This application claims the benefit under 35 U.S.C. §119 of Korean Patent Application No. 10-2013-0113526, filed Sep. 24, 2013, which is hereby incorporated by reference in its entirety.

BACKGROUND

Technical Field

The embodiment relates to a touch panel.

Recently, a touch panel, which performs an input function through the touch of an image displayed on a display by an input device such as a stylus pen or a hand, has been applied to various electronic appliances.

The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

In the resistive type touch panel, the repeated use thereof may degrade the performance thereof, and cause scratches. Accordingly, the interest in the capacitive type touch panel representing superior endurance and having a long lifespan is increased.

Meanwhile, the touch panel includes a cover substrate or substrate in which an active area to sense a touch point and an inactive area disposed at a peripheral portion of the active area are defined. The inactive area may be printed with a material having a predetermined color to prevent a printed circuit board, through which a wire is connected to an external circuit, from being viewed outside. For example, the cover substrate may be coated with black pigments or white pigments so that the printing layer may be formed on the inactive area.

Thereafter, a transparent electrode layer including a transparent conductive material is formed on the cover substrate or the substrate. The cover substrate may have a predetermined step difference by the printing layer formed on the cover substrate.

The step difference may cause the disconnection or the cracks to a wire electrode when the wire electrode is disposed on the wire electrode.

In addition, the step difference causes a gap in an adhesive layer when the substrate is bonded to the cover substrate by using the adhesive layer. Air is introduced into the adhesive layer through the gap in the adhesive layer when the substrate is bonded to the cover substrate to form an air layer, so that the adhesive strength between the cover substrate and the substrate is degraded. Accordingly, the defective product may be manufactured.

In order to solve the above problem, there is required a touch panel having a novel structure in which the step difference can be reduced when the printing layer is formed.

BRIEF SUMMARY

The embodiment provides a touch panel having improved reliability.

According to the embodiment, there is provided a touch panel including a cover substrate including an active area and an inactive area, and a printing layer only on the inactive area. The printing layer includes a first printing layer, and a second printing layer to surround the first printing layer. The second printing layer includes a top surface making contact with the top surface of the first printing layer and a lateral side making contact with a lateral side of the first printing layer. The lateral side of the second printing layer has an average inclination angle in a range of about 1.5° to about 2.7° with respect to one surface of the cover substrate.

As described above, according to the touch panel of the embodiment, the printing layer is formed in the shape of a reverse shape when the printing layer is formed on the inactive area of the cover substrate.

In other words, the printing layer provided on the upper most layer among the first to third printing layers, for example, the third printing layer is formed with a width greater than the widths of the first and second printing layers, so that the third printing layer can surround the lateral sides of the first printing layer and/or the second printing layer. In addition, if the width of the second printing layer is greater than that of the first printing layer, the second printing layer can surround the lateral side of the first printing layer.

Accordingly, the second printing layer surrounds the lateral side of the first printing layer, so that the step difference between the first printing layer and the cover substrate can be reduced. The third printing layer surrounds the lateral side of the first printing layer and/or the lateral side of the second printing layer, so that the step difference between the second printing layer and the first printing layer and/or the step difference between the first printing layer and the cover substrate can be reduced.

Accordingly, the step difference part between the entire portion of the printing layer and the cover substrate can be gently formed.

Therefore, when the wire electrode is formed on the printing layer, the cracks and the disconnection of the wire electrode caused by the step difference between the printing layers can be reduced.

In addition, as the entire portion of the printing layer is formed at a gentle inclination angle, the whole thickness of the printing layer can be reduced. Accordingly, additional printing layers such as the fourth and fifth printing layers can be formed, so that the visibility of the touch panel can be improved.

DETAILED DESCRIPTION

Figure 1:
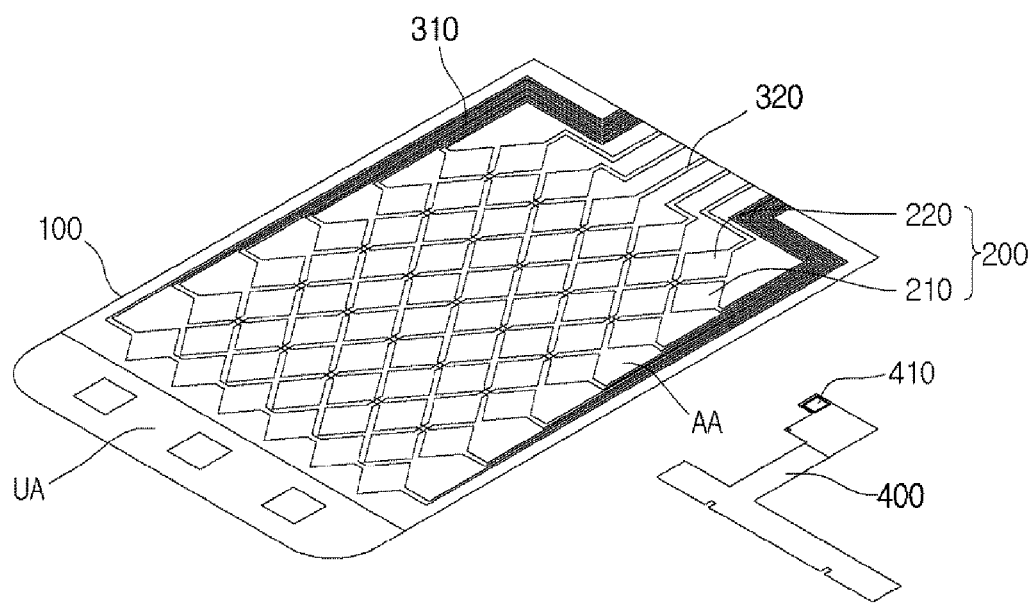
FIG. 1 is a perspective view showing a touch panel according to the embodiment.
Figure 2:
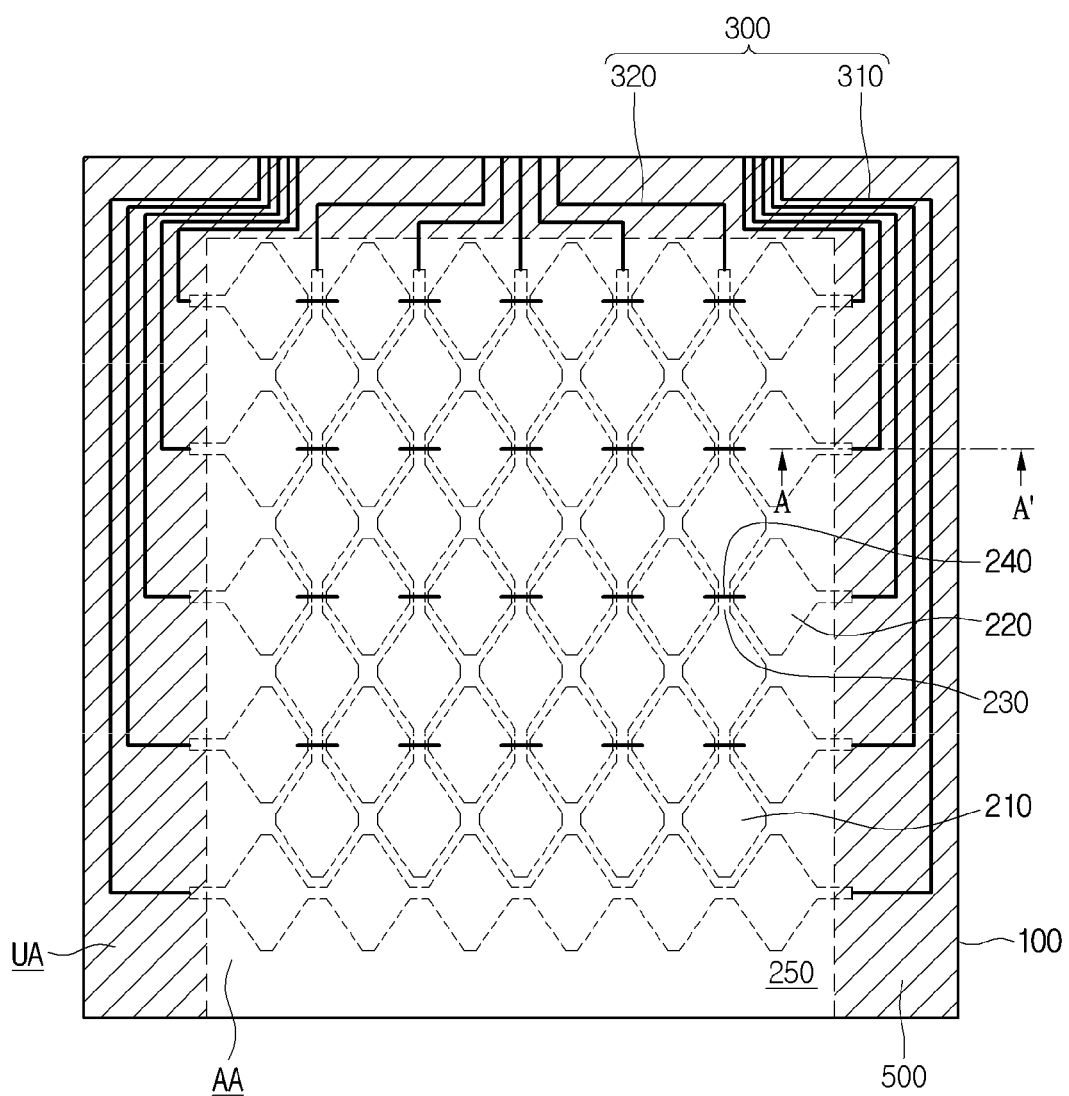
FIG. 2 is a plan view showing the top surface of the touch panel of FIG. 1.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer (or film), each region, each pattern or each structure shown in the drawings may be exaggerated, omitted or schematically drawn for the purpose of convenience or clarity. In addition, the size of each of the elements does not utterly reflect an actual size.

Hereinafter, the embodiments will be described with reference to the accompanying drawings.

Referring to FIGS. 1 to 6, a touch panel according to the embodiment may include a cover substrate 100, a sensing electrode 200 and a wire electrode 300 disposed on the cover substrate 100, and a printed circuit board 400 connected to the wire electrode 300.

The cover substrate 100 may include glass or plastic. For example, the cover substrate 100 may include tempered glass, half-tempered glass, sodalime glass, reinforced plastic, or flexible plastic.

The cover substrate 100 may include an active area AA and an inactive area UA. In detail, the active area AA refers to an area through which a touch instruction may be input by a user. To the contrary to the active area AA, the inactive area UA refers to an area to which the touch instruction is not input because the inactive area UA is not activated even if the touch of the user is input thereto.

For example, sensing electrodes 200 may be disposed in the active area AA of the cover substrate 100 and wire electrodes 300 may be disposed in the inactive area UA of the cover substrate 100.

The sensing electrode 200 may be disposed on the cover substrate 100. In detail, the sensing electrode 200 may be disposed in the active area AA on the cover substrate 100.

The sensing electrode 200 may include first and second electrodes 210 and 220.

The first sensing electrode 210 may extend in the first direction on the active area AA of the cover substrate 100. In detail, the first sensing electrode 210 may be disposed on one surface of the cover substrate 100.

In addition, the second sensing electrode 220 may extend in a second direction on the active area AA of the cover substrate 100. In detail, the second sensing electrode 220 may be disposed on one surface of the cover substrate 100 while extending in a direction different from the extending direction of the first sensing electrode 210. In more detail, the first and second sensing electrodes 210 and 220 may be disposed on the same surface of the cover substrate 100.

In this case, sensing electrode of one of the first and second sensing electrodes 210 and 220 may be connected to each other through a connection part 230.

An insulating layer 250 may be further disposed on the cover substrate 100. In detail, the insulating layer 250 may cover the first and second sensing electrodes 210 and 220.

Thereafter, in order to connect sensing electrodes, which are not connected to each other through the connection part, after forming a through hole in the insulting layer 250, a bridge electrode 240 is formed on the insulating layer 250 so that the sensing electrodes, which are not connected to each other through the connection part, can be connected to each other.

Therefore, the first and second sensing electrodes 210 and 220 may be disposed on the same surface, that is, one surface of the active area AA together without the contact between the first and second sensing electrodes 210 and 220.

Although accompanying drawings show that the sensing electrodes, the insulating layer, and the bridge electrode are sequentially disposed on the cover substrate as described above, the embodiment is not limited thereto. In other words, the bridge electrode, the insulating layer, and the sensing electrodes can be sequentially disposed on the cover substrate.

Figure 3:
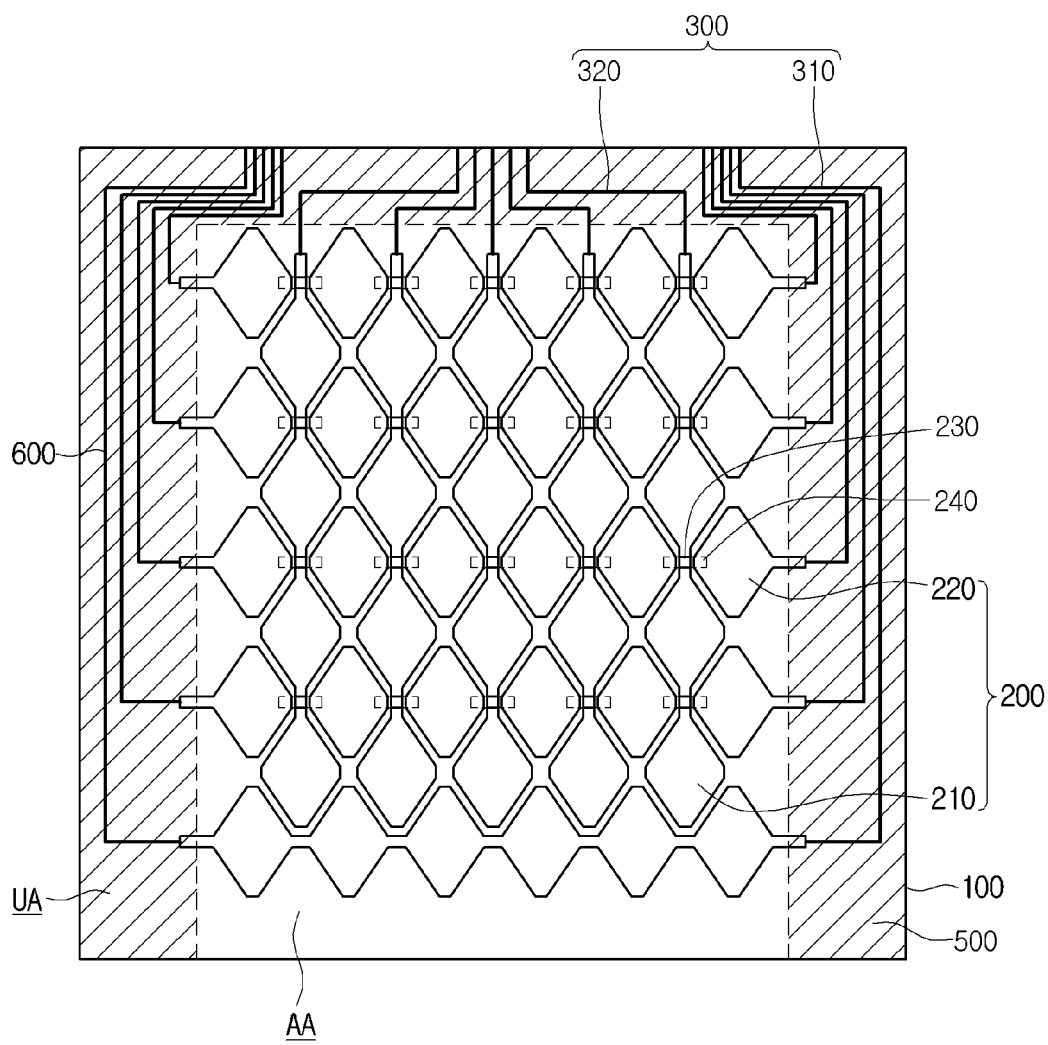
FIG. 3 is a plan view showing another top surface of the touch panel of FIG. 1.

In detail, referring to FIG. 3, after disposing the bridge electrode 240 on the active area AA of the cover substrate 100, and disposing the insulating layer 250 on a portion of the bridge electrode 240, the sensing electrodes 200 may be disposed on the bridge electrode 240 and the insulating layer 250. In other words, one of the first and second sensing electrodes 210 and 220 is disposed on the insulating layer 250 so that the first and second sensing electrodes 210 and 220 may be connected to each other through the connection part, and the other of the first and second sensing electrodes 210 and 220 is disposed on the bridge electrode 240, so that the first and second sensing electrodes 210 and 220 may be connected to each other through the bridge electrode 240.

The wire electrode 300 may be electrically connected to the first and second sensing electrodes 210 and 220. In detail, the wire electrode 300 may be disposed on the inactive area AA of the cover substrate 100 and electrically connected to the first and second sensing electrodes 210 and 220.

For example, the wire electrode 300 may include a first wire electrode 310 connected to the first sensing electrode 210 and a second wire electrode 320 connected to the second sensing electrode 220.

The wire electrode 300 may include a conductive material. For example, the wire electrode 300 may include a metallic material such as copper (Cu) or silver (Ag), but the embodiment is not limited thereto. The wire electrode 30 may include a transparent conductive material such as indium tin oxide (ITO).

The wire electrode 300 may receive a sensed touch signal from the sensing electrode 200, and may transmit the touch signal to a driving chip 410 mounted on the printed circuit board 400, which is electrically connected to the wire electrode 300, through the wire electrode 300.

In detail, the wire electrode 300 may be connected to the sensing electrode 200 extending from the active area AA to the inactive area UA. The sensing electrode 200 may be connected to the top surface or the bottom surface of the wire electrode 300.

The printed circuit board 400 may be disposed on the inactive area UA. The printed circuit board 400 may include a flexible printed circuit board (FPCB). The printed circuit board 400 may be connected to the wire electrode 300 disposed on the inactive area UA. In detail, the printed circuit board 400 may be electrically connected to the wire electrode 300 on the inactive area UA.

The printed circuit board 400 may have the driving chip 410 mounted thereon. In detail, the driving chip 410 may receive the touch signal sensed by the sensing electrode 200 from the wire electrode 300 to perform an operation according to the touch signal.

The above-described wire electrode 300 is disposed on the inactive area UA of the cover substrate 100. In detail, the wire electrode 300 is disposed on a printing layer 500 disposed on the inactive area UA of the cover substrate 100. The printing layer 500 may be disposed on the inactive area UA so that the wire electrode 300 disposed on the cover substrate is not viewed. The printing layer 500 may be transparent, semi-transparent, or opaque. In this case, the transparent printing layer views an electrode disposed thereon on a cover substrate. The opaque printing layer prevents the electrode disposed thereon on the cover substrate from being viewed by naked eyes of a person. The semi-transparent printing layer partially views the electrode disposed thereon on the cover substrate.

Figure 4:
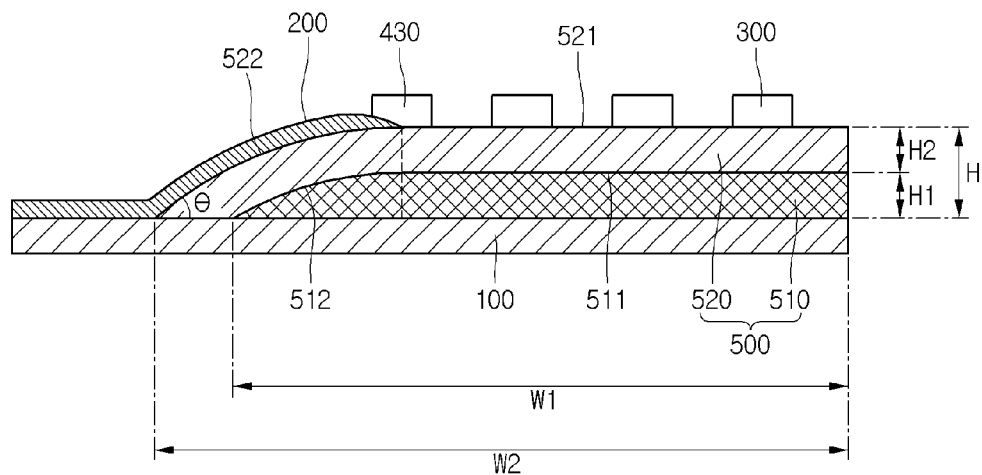
FIGS. 4 to 6 are sectional views taken along line A-A' of FIG. 2, which shows a printing layer according to the first embodiment.
Figure 5:
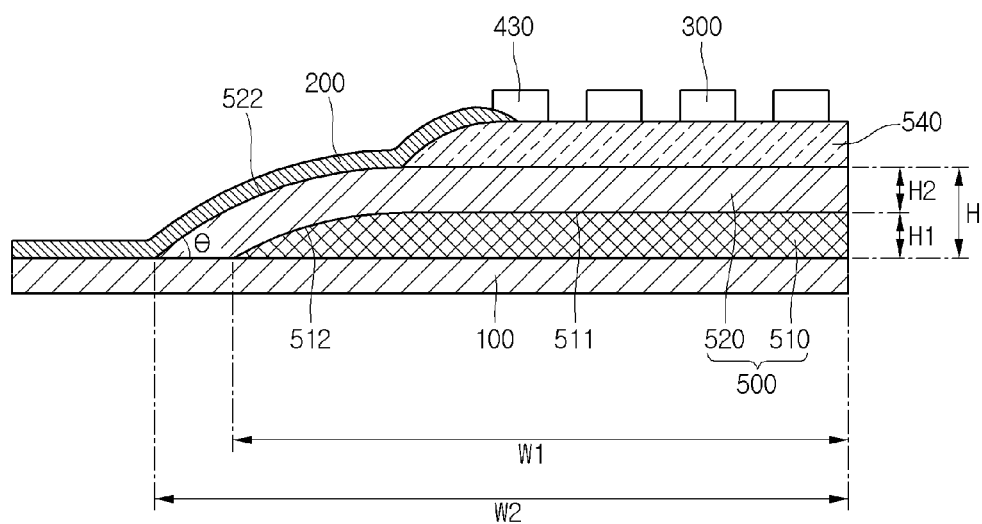
Figure 6:
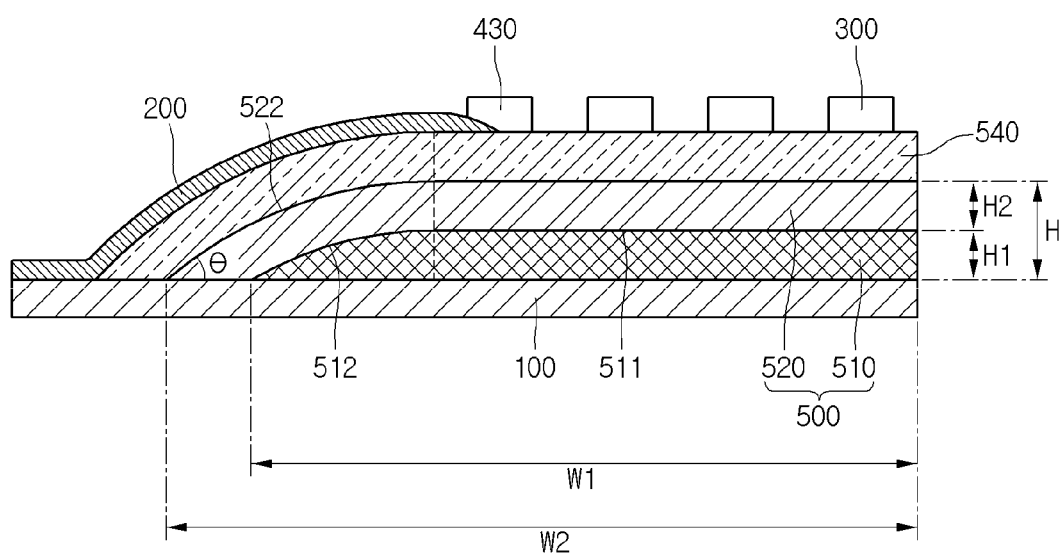

Referring to FIGS. 4 to 6, the printing layer 500 of the touch panel according to the first embodiment may include first and second printing layers 510 and 520. In detail, the first printing layer 510 may be disposed on the cover substrate 100, and the second printing layer 520 may be disposed on the first printing layer 510.

The first and second printing layers 510 and 520 may be semi-transparent, or opaque. For example, the first and second printing layers 510 and 520 may be colored opaque printing layers. In other words, the first and second printing layers 510 and 520 may have at least one of black, white, and blue.

The first and second printing layers 510 and 520 may extend from one end of the inactive area UA to an opposite end of the inactive area UA. In detail, the first and second printing layers 510 and 520 may extend from one end of the inactive area UA to the opposite end of the inactive area UA forming the boundary surface with the active area AA.

The first and second printing layers 510 and 520 may have a predetermined width on the inactive area UA. In other words, the first and second printing layers 510 and 520 may be disposed with a predetermined width on the inactive area UA while extending from one end of the inactive area UA to the opposite end of the inactive area UA forming the boundary surface with the active area AA.

In detail, the second printing layer 520 may have a width W2 wider than a width W1 of the first printing layer 510.

The first printing layer 510 may be defined by a top surface 511 and a lateral side 512 of the first printing layer 510. In detail, the top surface 511 of the first printing layer 510 may refer to a surface substantially parallel to one surface of the first printing layer 510 making contact with the cover substrate 100. The lateral side 512 of the first printing layer 510 may refer to a surface inclined with respect to the top surface 511 of the first printing layer 510 while extending from the top surface 511 of the first printing layer 510.

The second printing layer 520 may surround the first printing layer 510. In detail, the second printing layer 520 may dispose the top surface 511 and the lateral side 512 of the first printing layer 510. For example, the second printing layer 520 may make contact with the top surface 511 and the lateral side 512 of the first printing layer 510.

Accordingly, the second printing layer 520 may be defined by a top surface 521 and a lateral side 522 of the second printing layer 520. In detail, the second printing layer 520 may be defined by the top surface 521 of the second printing layer 520 making contact with the top surface 511 of the first printing layer 510 and the lateral side 522 of the second printing layer 520 making contact with the lateral side 512 of the first printing layer 510.

The lateral side 522 of the second printing layer 520 may have a predetermined inclination with respect to one surface 101 of the cover substrate 100. The lateral side 522 of the second printing layer 522 may be inclined at an average inclination angle θ of about 3° or less with respect to the one surface 101 of the substrate 100. In detail, the lateral side 522 of the second printing layer 520 may be inclined at an inclination angle θ of about 1.5° to about 3° with respect to the one surface 101 of the substrate 100. In more detail, the lateral side 522 of the second printing layer 520 may be inclined at an average inclination angle θ of about 1.5° to about 2.7° with respect to the one surface 101 of the substrate 100.

The average inclination angle of less than about 1.5° may not be formed due to the process characteristic. In the case of the average inclination angle of more than about 3°, the sensing electrode and the wire electrode extending from the active area AA to the inactive area UA are cracked at the inclined area of the printing layer so that the reliability of the sensing and wire electrodes may be degraded.

The average inclination angle of the lateral side 522 of the second printing layer 500 with respect to the one surface 101 of the cover substrate 100 may refer to an inclination angle formed between a virtual line, which connects a boundary line between the one surface 101 of the cover substrate 100 and the lateral side 522 of the second printing layer 520 to a boundary line between the lateral side 522 of the second printing layer 520 and the top surface 521 of the second printing layer 520, and the one surface 101 of the cover substrate 100.

The printing layer 500 may have a predetermined thickness. In more detail, the height H, that is, the vertical height from one surface of the cover substrate 100 to the top surface of the printing layer 500 may be about 20 μm or less. In more detail, the height H, that is, the vertical height from the one surface of the cover substrate 100 to the top surface of the printing layer 500 may be in the range of about 15 μm to about 20 μm.

If the height H, that is, the vertical height from one surface of the cover substrate 100 to the top surface of the printing layer 500 is less than about 15 μm, the wire on the printing layer may be viewed at the outside. If the height H, that is, the vertical height from one surface of the cover substrate 100 to the top surface of the printing layer 500 is more than about 20 μm, the whole thickness of the touch panel may be increased due to the height of the printing layer 500. In the touch panel according to the first embodiment, the wire electrode 300 may be disposed on the printing layer 500. In detail, the wire electrode 300 may be disposed on the top surface of the second printing layer 520.

The wire electrode 300 may be connected to the sensing electrode 200 through a pad part 430 on the top surface of the second printing layer 520, and may extend to the inactive area UA in which the printed circuit board 400 is located so that the wire electrode 300 may be connected to the printed circuit board 400.

A passivation layer may be further disposed on the top surface of the second printing layer 520. In detail, the passivation layer may be disposed on the top surface of the second printing layer 520 while surrounding the wire electrode 300 except for the pad part 430.

The passivation layer protects the wire electrode from the outside to protect the wire electrode 300 from being oxidized and damaged.

Referring to FIGS. 5 and 6, the touch panel according to the first embodiment may further include a reinforcing printing layer 540 on the printing layer 520. In detail, the reinforcing printing layer 540 may be disposed on the top surface of the second printing layer 520. In more detail, the reinforcing printing layer 540 may have a width wider than or narrower than that of the second printing layer 520.

In other words, as shown in FIG. 5, if the reinforcing printing layer 540 may have a width narrower than that of the second printing layer 520, the reinforcing printing layer 540 may be disposed on the top surface of the second printing layer 520. As shown in FIG. 6, if the reinforcing printing layer 540 may have a width wider than that of the second printing layer 520, the reinforcing printing layer 540 may be disposed on the top surface and the lateral side of the second printing layer 520 to surround the second printing layer 520.

If the reinforcing printing layer 540 is disposed on the second printing layer 520, the wire electrode 300 and the passivation layer on the printing layer 500 may be disposed on the reinforcing printing layer 540.

The reinforcing printing layer 540 may be semi-transparent, or opaque. In addition, if the reinforcing printing layer 540 has an opaque color, the reinforcing printing layer 540 may have a color different from those of the first and second printing layers 510 and 520.

Hereinafter, a printing layer of a touch panel according to various embodiments will be described with reference to FIGS. 7 to 15. In the following description of various embodiments, the structure or the elements the same as or similar to those of the touch panel according to the first embodiment described above will not be further described, and the same reference numerals will be assigned to the same elements.

Figure 7:
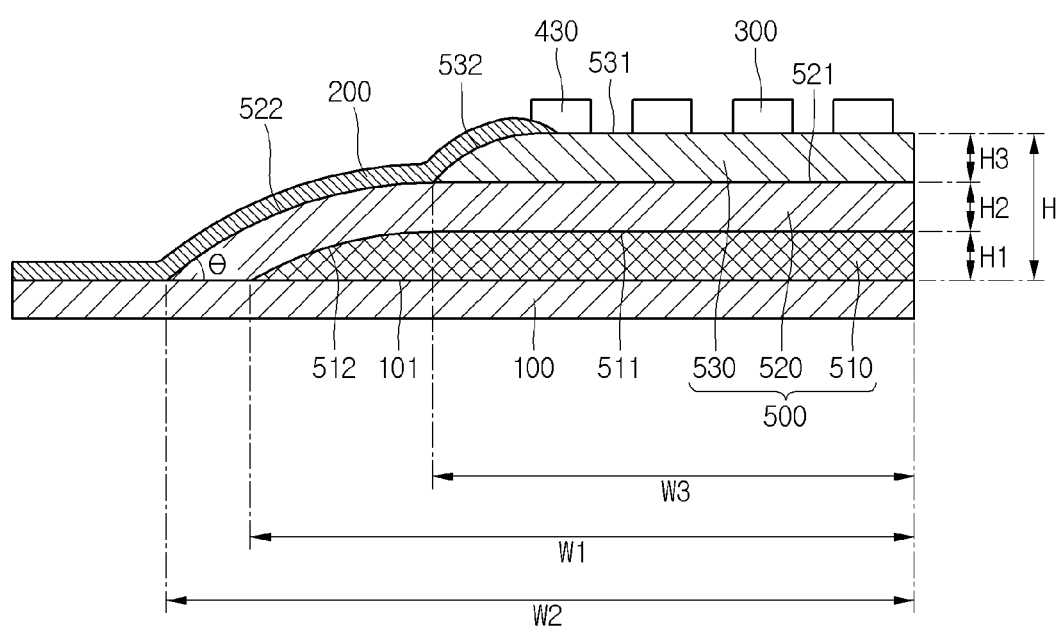
FIGS. 7 to 9 are sectional views taken along line A-A' of FIG. 2, which shows a printing layer according to the second embodiment.
Figure 8:
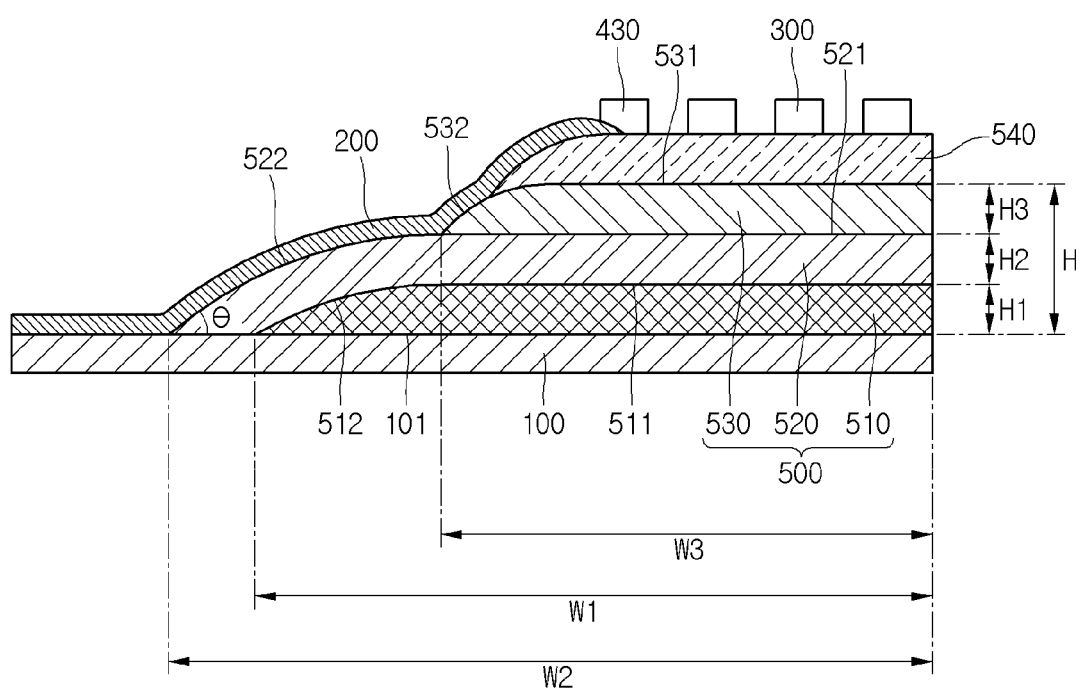
Figure 9:
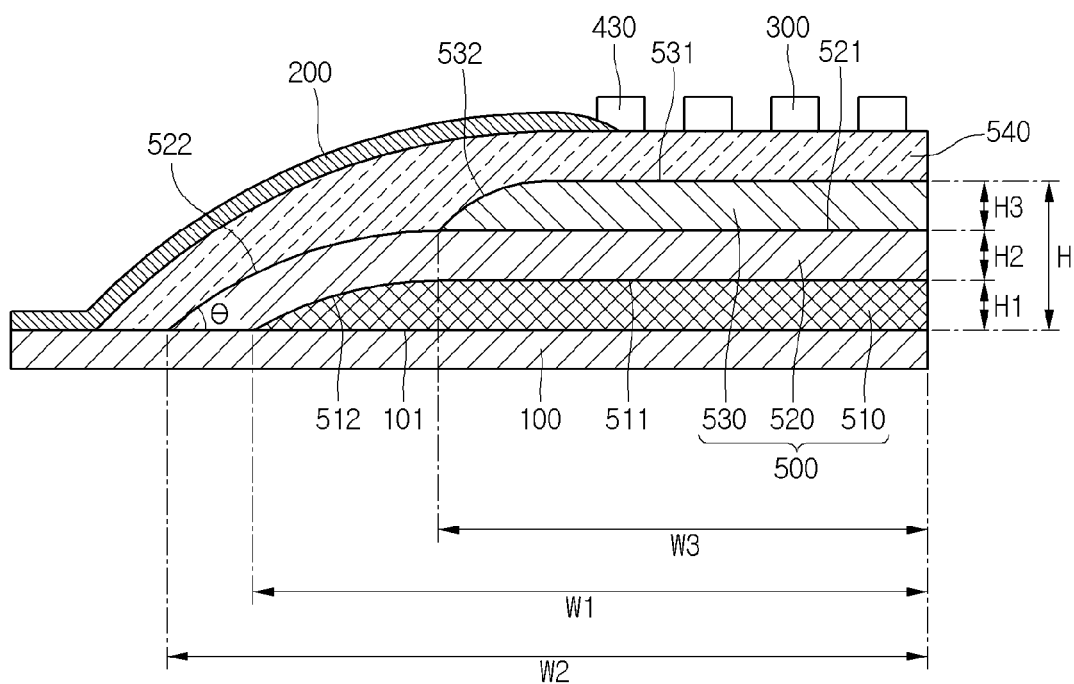

Referring to FIGS. 7 to 9, a printing layer of a touch panel according to the second embodiment may include first to third printing layers 510, 520, and 530.

The first to third printing layers 510 to 530 may be sequentially disposed on one surface of the cover substrate 100, that is, the inactive area UA.

The first to third printing layers 510 to 530 may be disposed with widths different from each other. In detail, the width W2 of the second printing layer 520 may be greater than the width W1 of the first printing layer 510. In addition, the width W3 of the third printing layer 530 may be narrower than the width W2 of the second printing layer 520.

Therefore, the second printing layer 520 may surround the first printing layer 510, and the third printing layer 530 may be disposed on the second printing layer 520. In detail, the second printing layer 520 may surround the top surface 511 and the lateral side 512 of the first printing layer 510, and the third printing layer 530 may be disposed on the top surface 521 of the second printing layer 520. For example, the second printing layer 520 may make contact with the top surface 511 and the lateral side 512 of the first printing layer 510 and the third printing layer 530 may make contact with the top surface 521 of the second printing layer 520.

Accordingly, the lateral side 522 of the second printing layer 520 may have a predetermined inclination with respect to one surface 101 of the cover substrate 100. In detail, the lateral side 522 of the second printing layer 520 may be inclined at an average inclination angle θ of about 3° or less with respect to the one surface 101 of the substrate 100. In detail, the lateral side 522 of the second printing layer 520 may be inclined at an average inclination angle θ of about 1.7° to about 2.9° with respect to the one surface 101 of the substrate 100.

The average inclination angle of less than about 1.7° may not be formed due to the process characteristic. In the case of the average inclination angle of more than about 2.9°, the sensing electrode and the wire electrode extending from the active area AA to the inactive area UA are cracked at the inclined area of the printing layer so that the reliability of the sensing and wire electrodes may be degraded.

The printing layer 500 may have a predetermined thickness. In more detail, the height H, that is, the vertical height from one surface of the cover substrate 100 to the top surface of the printing layer 500 may be about 20 μm or less. In more detail, the height H, that is, the vertical height from the one surface of the cover substrate 100 to the top surface of the printing layer 500 may be in the range of about 15 μm to about 20 μm.

If the height H, that is, the vertical height from one surface of the cover substrate 100 to the top surface of the printing layer 500 is less than about 15 μm, the wire on the printing layer may be viewed at the outside. If the height H, that is, the vertical height from one surface of the cover substrate 100 to the top surface of the printing layer 500 is more than about 20 μm, the whole thickness of the touch panel may be increased due to the height of the printing layer 500.

The first to third printing layers 510 to 530 may have a predetermined thickness. In more detail, the height H1, that is, the vertical height from one surface of the cover substrate 100 to the top surface of the first printing layer 510 may be in the range of about 5 μm to 7 μm. In addition, the height H2, that is, the vertical height from the top surface of the first printing layer 510 to the top surface of the second printing layer 520 may be in the range of about 5 μm to 7 μm. In addition, the height H3, that is, the vertical height from the top surface of the second printing layer 520 to the top surface of the third printing layer 530 may be in the range of about 5 μm to 7 μm The first to third printing layers 510 to 530 may have an equal thickness or mutually different thicknesses within the above range. If the thicknesses of the first to third printing layers 510 to 530 are less than about 5 μm, the wire on the printing layer may be viewed at the outside. If the thicknesses of the first to third printing layers 510 to 530 are more than about 7 μm, the whole thickness of the touch panel may be increased due to the height of the printing layers.

Referring to FIGS. 8 and 9, the reinforcing printing layer 540 may be further disposed on the third printing layer 530. In detail, the reinforcing printing layer 540 may be disposed on the top surface 521 of the third printing layer 530. In more detail, the reinforcing printing layer 540 may have a width wider than or narrower than that of the third printing layer 530.

In other words, as shown in FIG. 8, if the reinforcing printing layer 540 has a width narrower than that of the third printing layer 530, the reinforcing printing layer 540 may be disposed on the top surface of the third printing layer 530. In other words, as shown in FIG. 9, if the reinforcing printing layer 540 has a width wider than that of the third printing layer 530, the reinforcing printing layer 540 may be disposed on the top surface and the lateral side of the third printing layer 530 to surround the third printing layer 530.

The reinforcing printing layer 540 may be semi-transparent, or opaque. In addition, if the reinforcing printing layer 540 has an opaque color, the reinforcing printing layer 540 may have a color different from those of the first to third printing layers 510 to 530.

Figure 10:
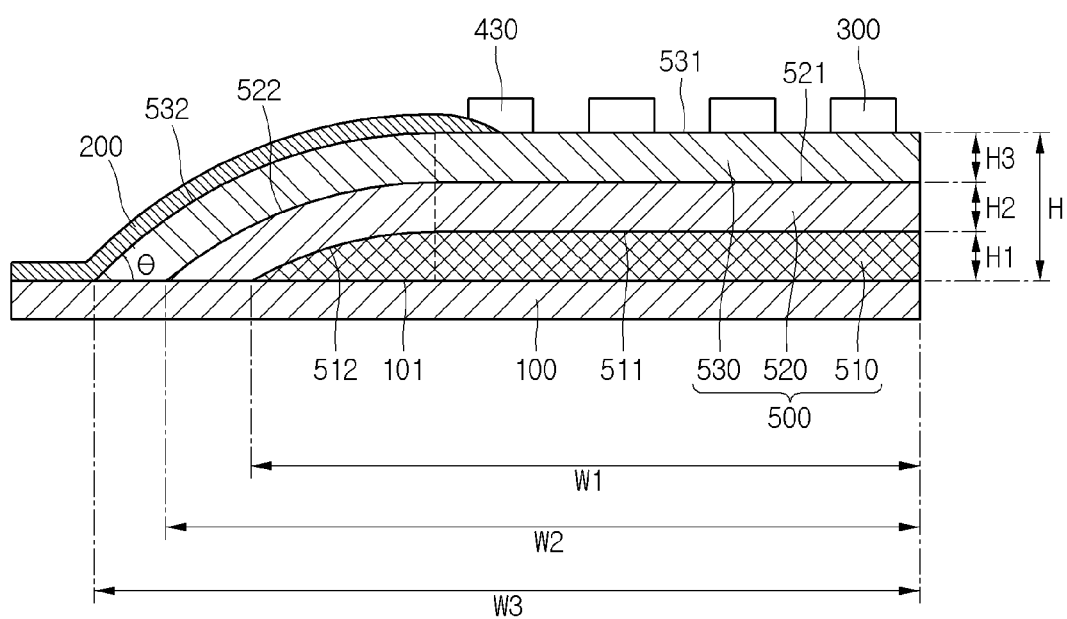
FIGS. 10 to 12 are sectional views taken along line A-A' of FIG. 2, which shows a printing layer according to the third embodiment.
Figure 11:
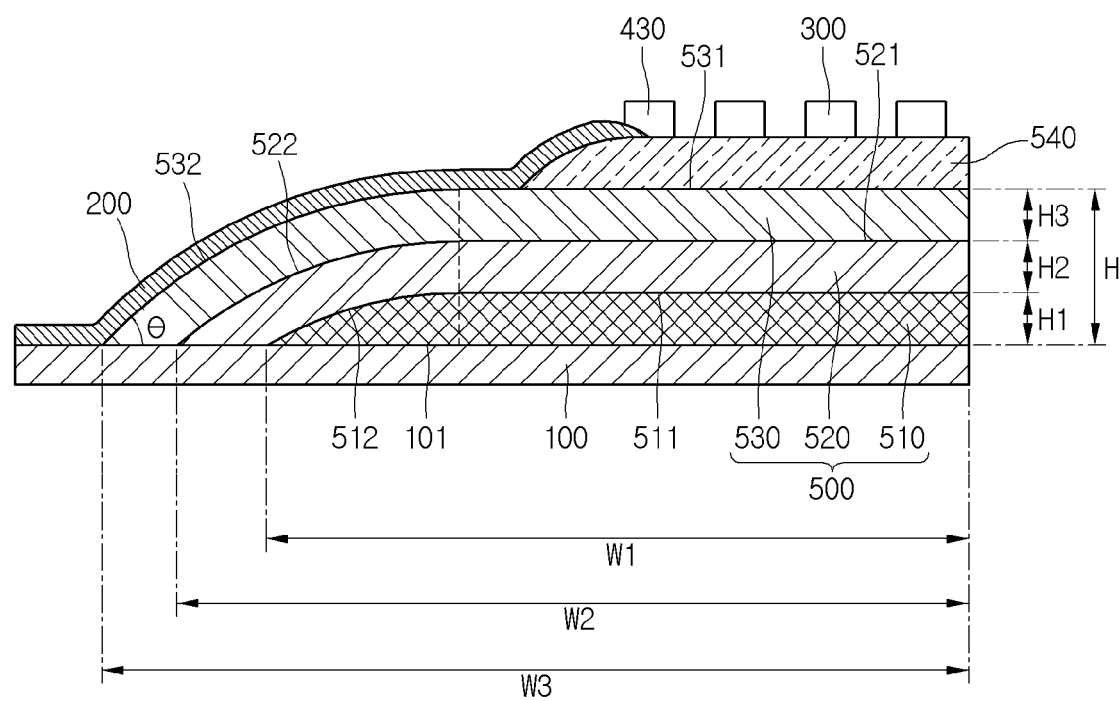
Figure 12:
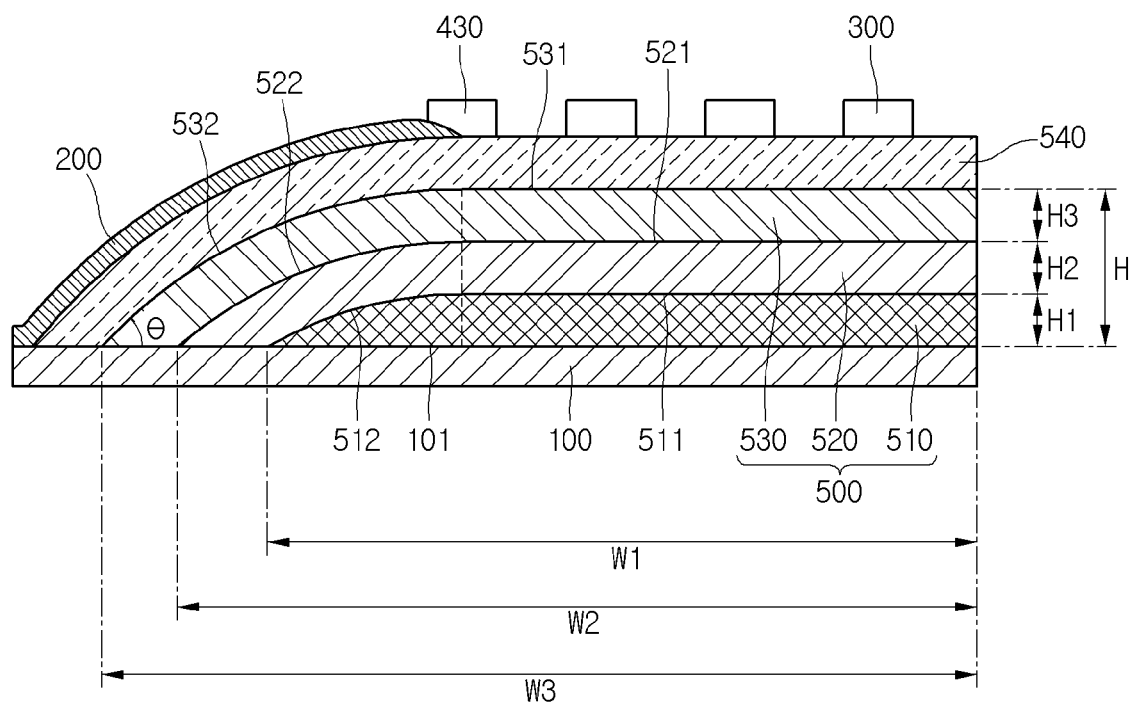

Referring to FIGS. 10 to 12, a printing layer of a touch panel according to the third embodiment may include the first to third printing layers 510 to 530. Differently from the second embodiment, the touch panel according to the third embodiment may have the third printing layer 530 having the width wider than those of the first and second printing layers 510 and 520.

In other words, the width W2 of the second printing layer 520 may be wider than the width W1 of the first printing layer 510, and the width W3 of the third printing layer 530 may be wider than the width W2 of the second printing layer 520.

Therefore, the second printing layer 520 may surround the top surface 511 and the lateral side 512 of the first printing layer 510, and the third printing layer 530 may surround the top surface 521 and the lateral side 522 of the second printing layer 520.

Accordingly, the lateral side 532 of the third printing layer 530 may have a predetermined inclination with respect to one surface 101 of the cover substrate 100. In detail, the lateral side 532 of the third printing layer 530 may be inclined at an average inclination angle θ of about 3° or less with respect to the one surface 101 of the cover substrate 100. In more detail, the lateral side 532 of the third printing layer 530 may be inclined at an average inclination angle θ of about 1.7° to about 2.9° with respect to the one surface 101 of the cover substrate 100.

The average inclination angle of less than about 1.7° may not be formed due to the process characteristic. In the case of the average inclination angle of more than about 2.9°, the sensing electrode and the wire electrode extending from the active area AA to the inactive area UA are cracked at the inclined area of the printing layer so that the reliability of the sensing and wire electrodes may be degraded.

Referring to FIGS. 11 and 12, the reinforcing printing layer 540 may be further on the third printing layer 530. In detail, the reinforcing printing layer 540 may be disposed on the top surface 531 of the third printing layer 530. In more detail, the reinforcing printing layer 540 may have a width wider than or narrower than that of the third printing layer 530.

In other words, as shown in FIG. 11, if the reinforcing printing layer 540 may have a width narrower than that of the third printing layer 530, the reinforcing printing layer 540 may be disposed on the top surface 531 of the third printing layer 530. As shown in FIG. 12, if the reinforcing printing layer 540 may have a width wider than that of the third printing layer 530, the reinforcing printing layer 540 may be disposed on the top surface 531 and the lateral side 532 of the third printing layer 530 to surround the third printing layer 530.

Figure 13:
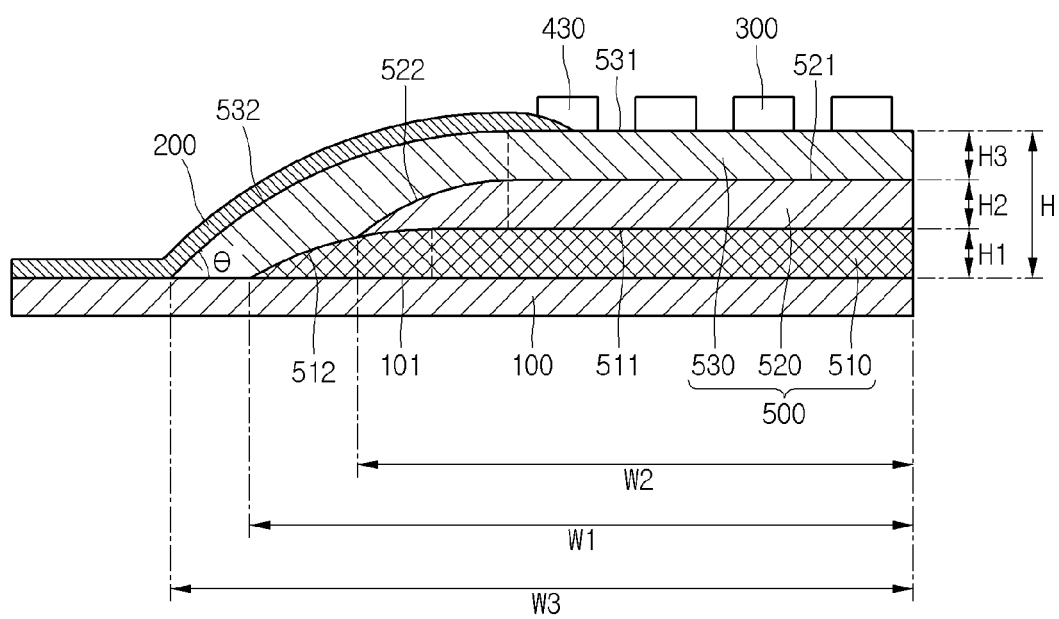
FIGS. 13 to 15 are sectional views taken along line A-A' of FIG. 2, which shows a printing layer according to the fourth embodiment.
Figure 14:
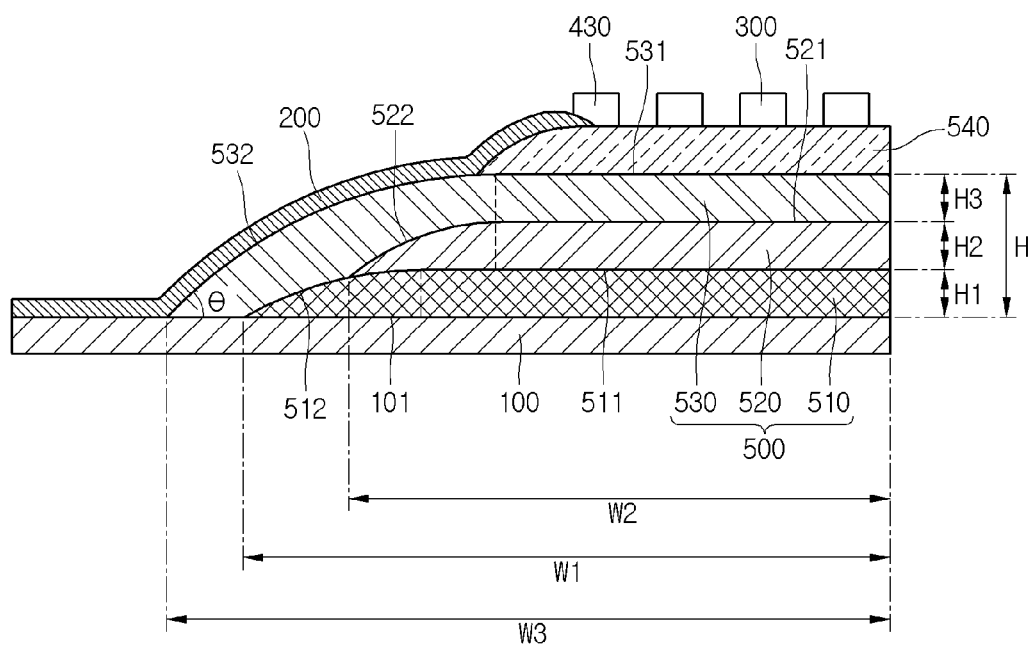
Figure 15:
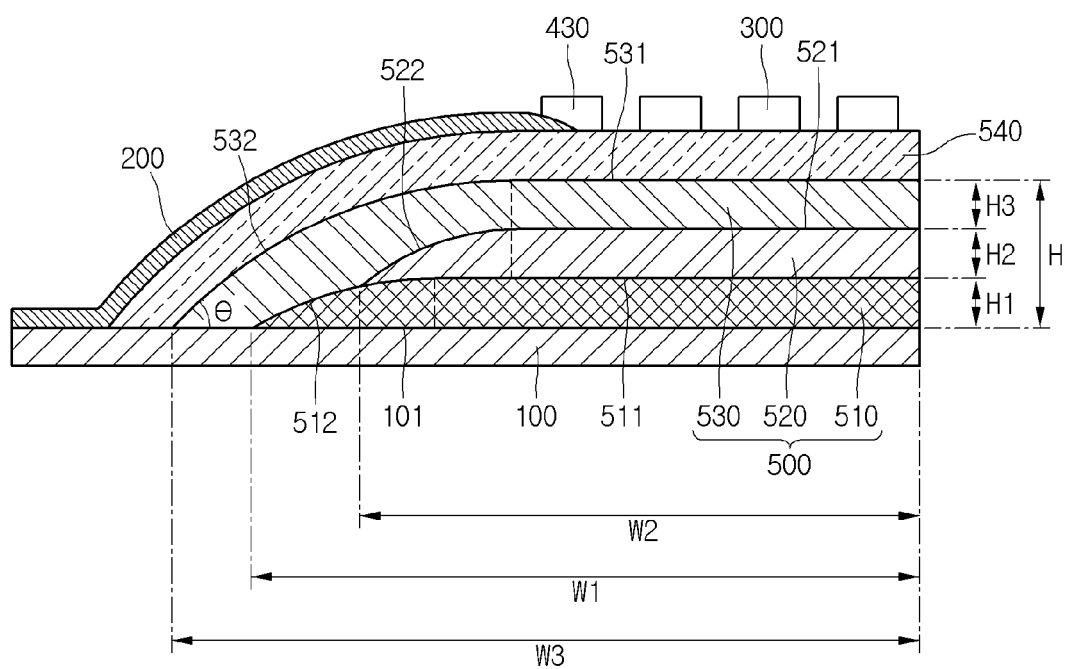

Referring to FIGS. 13 to 15, a printing layer of a touch panel according to the fourth embodiment may include the first to third printing layers 510 to 530. Differently from the second and third embodiments, in the touch panel according to the fourth embodiment, the width W2 of the second printing layer 530 is narrower than the width W1 of the first printing layer 510, and the width W3 of the third printing layer 530 may be greater than the width W1 of the first printing layer 510 and the width W2 of the second printing layer 520.

Accordingly, the third printing layer 530 may surround the top surface 521 of the second printing layer 520, and the lateral side 512 of the first printing layer 510.

Accordingly, the lateral side 532 of the third printing layer 530 may have a predetermined inclination with respect to one surface 101 of the cover substrate 100. In detail, the lateral side 532 of the third printing layer 530 may be inclined at an average inclination angle θ of about 3° or less with respect to the one surface 101 of the substrate 100. In more detail, the lateral side 532 of the third printing layer 530 may be inclined at an average inclination angle θ of about 1.7° to about 2.9° with respect to the one surface 101 of the substrate 100.

The average inclination angle of less than about 1.7° may not be formed due to the process characteristic. In the case of the average inclination angle of more than about 2.9°, the sensing electrode and the wire electrode extending from the active area AA to the inactive area UA are cracked at the inclined area of the printing layer so that the reliability of the sensing and wire electrodes may be degraded.

Referring to FIGS. 14 and 15, the reinforcing printing layer 540 may be further on the third printing layer 530. In detail, the reinforcing printing layer 540 may be disposed on the top surface 531 of the third printing layer 530. In more detail, the reinforcing printing layer 540 may have a width wider than or narrower than that of the third printing layer 530.

In other words, as shown in FIG. 14, if the reinforcing printing layer 540 has a width narrower than that of the third printing layer 530, the reinforcing printing layer 540 may be disposed on the top surface of the third printing layer 530. In other words, as shown in FIG. 15, if the reinforcing printing layer 540 has a width wider than that of the third printing layer 530, the reinforcing printing layer 540 may be disposed on the top surface 531 and the lateral side 531 of the third printing layer 530 to surround the third printing layer 530.

In the touch panel according to the second to fourth embodiments, the wire electrode 300 may be disposed on the printing layer 500. In detail, the wire electrode 300 may be disposed on the top surface 531 of the third printing layer 530.

The wire electrode 300 may be connected to the sensing electrode 200 through the pad part 430 on the top surface of the third printing layer 530, and may extend to the inactive area UA in which the printed circuit board 400 is located so that the wire electrode 300 may be connected to the printed circuit board 400.

The sensing electrode may be provided on the upper surface or the lower surface of the wire electrode and may be connected to the wire electrode through the pad part.

In other words, the sensing electrode may extend along the lateral side of the second printing layer so that the sensing electrode may be connected to the wire electrode. In addition, the sensing electrode may extend along the lateral side of the second printing layer or the third printing layer, so that the sensing electrode may be connected to the wire electrode.

A passivation layer may be further disposed on the top surface 531 of the third printing layer 530. In detail, the passivation layer may be disposed on the top surface 531 of the third printing layer 530 while surrounding the wire electrode 300 except for the pad part 430.

The passivation layer protects the wire electrode from the outside to protect the wire electrode 300 from being oxidized and damaged.

If the reinforcing printing layer 540 is disposed on the third printing layer 530, the wire electrode and the passivation layer on the printing layer may be disposed on the reinforcing printing layer 540.

Hereinafter, still another embodiment will be described with reference to FIGS. 16 and 17. In the following description of the touch panel according to still another embodiment, the structure or the elements the same as or similar to those of the touch panel according to the first to fourth embodiments described above will not be further described, and the same reference numerals will be assigned to the same elements.

Figure 16:
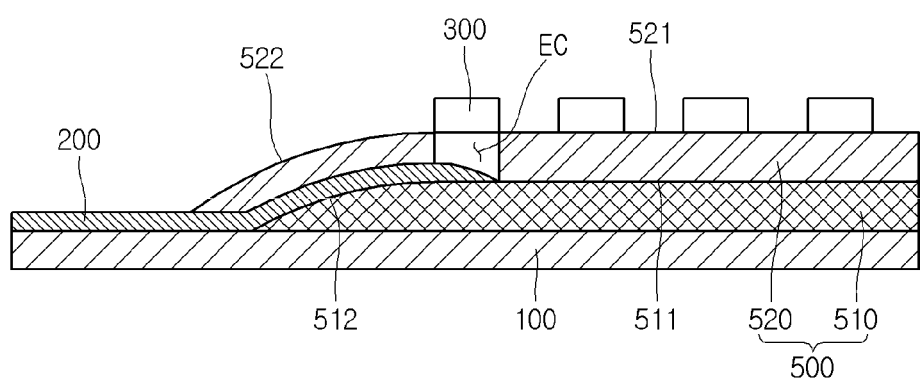
FIGS. 16 and 17 are sectional views taken along line A-A' of FIG. 2, which shows a printing layer according to the fifth embodiment.
Figure 17:
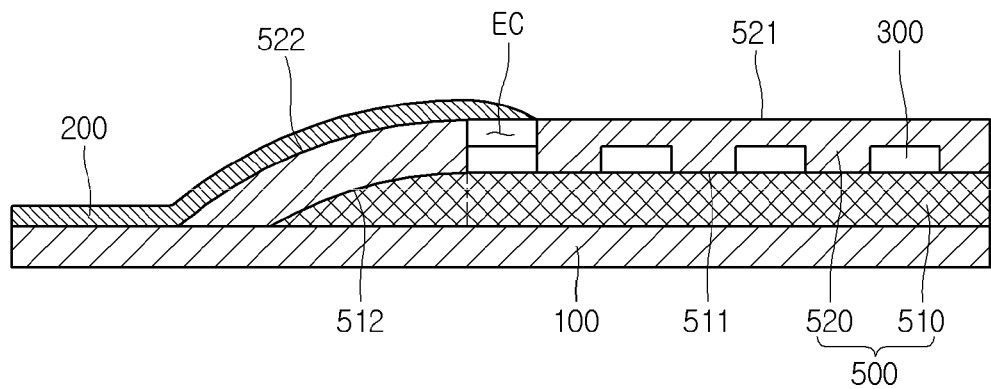

Referring to FIGS. 16 and 17, a touch panel according to the fifth embodiment may include a printing layer having a conductive area EA formed therein.

The printing layer may include first and second printing layers 510 and 520, and the wire electrode 300 and the sensing electrode 200 may be disposed on the printing layer.

The sensing electrode 200 and the wire electrode 300 may be electrically connected to each other through the conductive area EA formed on the printing layer.

In detail, referring to FIG. 16, the wire electrode 300 may be disposed on the second printing layer 520, and the sensing electrode 200 may be interposed between the first and second printing layers 510 and 520. In addition, a conductive area EC may be formed on the second printing layer 520. Accordingly, the sensing electrode 200 may be connected to the wire electrode 300 through the conductive area EC.

In addition, referring to FIG. 17, the sensing electrode 200 may be disposed on the second printing layer 520, and the wire electrode 300 may be interposed between the first and second printing layers 510 and 520. In addition, the conductive area EC may be formed on the second printing layer 520. Accordingly, the sensing electrode 200 and the wire electrode 300 may be connected to each other through the conductive area EC.

Although the description has been made with reference to FIGS. 16 and 17 in terms of only the first and second printing layers, the embodiment is not limited thereto. In other words, the third printing layer may be additionally disposed on the second printing layer, and the wire electrode or the sensing electrode may be interposed between the first and second printing layers or the second and third printing layers. In addition, the wire electrode and the sensing electrode may be electrically connected to each other through the conductive area formed on the second printing layer and/or the third printing layer.

In other words, according to the touch panel of the embodiment, when a three-color printing scheme is applied, the thickness of the printing layer can be more reduced as compared with the thickness of the printing layer according to the related art. In detail, as the third printing layer surrounds the step difference part between the first printing layer and the second printing layer, the whole thicknesses of the printing layer can be reduced. In addition, additional printing layers such as fourth and fifth printing layer can be disposed on the third printing layer.

According to the touch panel of the embodiments, the step difference can be reduced between the printing layers provided in the inactive area of the cover substrate. In other words, the printing layers can be provided in the shape of a reverse step, thereby reducing the step difference between the printing layers.

In other words, according to the touch panel of the embodiment, a printing layer provided on the upper most top surface, for example, the second printing layer or the third printing layer is formed with the widest width, and the second printing layer or the third printing layer surrounds the lateral side of the first printing layer and/or the second printing layer, respectively, so that the whole printing layers have in the shape of a reverse step, thereby reducing the step difference between the printing layers.

Therefore, as upper printing layers are filled in lower printing layers or the step difference part between the lower printing layers, so that an inclination resulting from the step difference between the printing layer and the cover substrate may be gently formed.

Therefore, when the sensing electrode or the wire electrode is formed on the printing layer, the electrodes can be prevented from being shorted and cracked due to the step difference between the printing layers, so that the reliability and the efficiency of the touch panel can be improved.

In addition, the whole thicknesses of the printing layers can be reduced by gently reducing the step difference between the printing layers. In addition, since the whole thicknesses of the printing layers can be reduced, another printing layer can be additionally formed on the printing layer. The visibility of the touch panel can be improved.

Hereinafter, another type of touch panel according another embodiment will be described with reference to FIGS. 18 and 19. In the following description of another type of the touch panel according to another embodiment, the structure or the elements the same as or similar to those of the touch panel described above will not be further described, and the same reference numerals will be assigned to the same elements.

Figure 18:
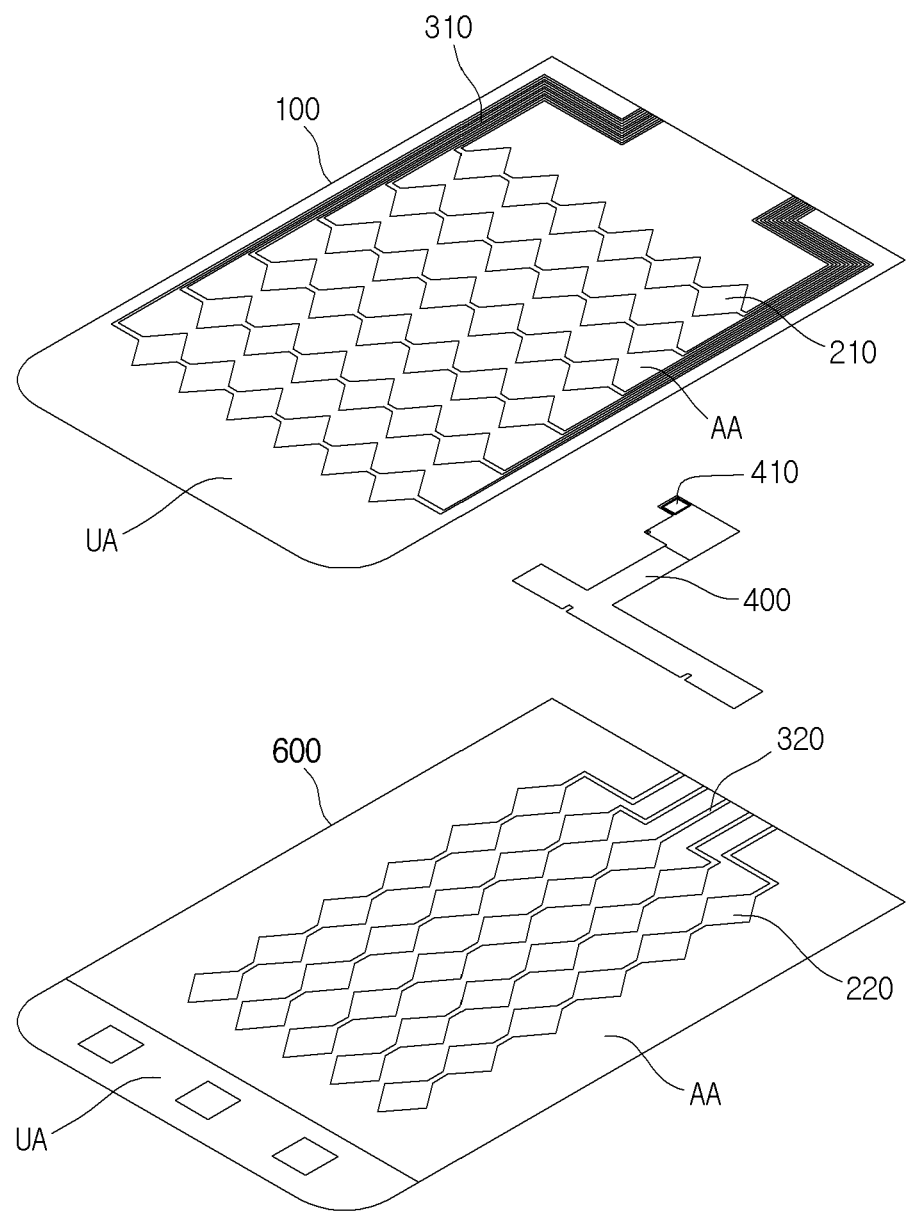
FIGS. 18 and 19 are sectional views showing various types of touch panels according to various embodiments.

Referring to FIG. 18, the touch panel according to another embodiment further includes a substrate 600 provided on the cover substrate 100. The substrate 600 may include plastic. For example, the substrate 600 may include polyethylene terephthalate (PET).

The cover substrate 100 may be bonded to the substrate 600 through an adhesive layer. In detail, the cover substrate and the substrate 600 may be bonded to each other through the adhesive layer including an optical clear adhesive.

The cover substrate 100 and the substrate 600 include an active area and an inactive area. The active and inactive areas have the same meanings as those described above.

A first sensing electrode 210 may be disposed in the active area of the cover substrate 100. In addition, the first wire electrode 310 connected to the first sensing electrode 210 may be disposed in the inactive area of the cover substrate 100.

A second sensing electrode 220 may be disposed in the active area of the cover substrate 600. In addition, the second wire electrode 320 connected to the second sensing electrode 220 may be disposed in the inactive area of the substrate 600.

In addition, the first and second wire electrodes 310 and 320 may be electrically connected to the printing circuit board 400.

According to the touch panel of another embodiment, the cracks in the electrode described above can be prevented so that the reliability of the touch panel can be improved, and the adhesive strength between the cover substrate and the substrate can be improved. In detail, the step difference between the printing layers of the cover substrate can be reduced. Accordingly, in order to bond the substrate onto the cover substrate, the gap resulting from the step difference between the adhesive layer, which is disposed between the cover substrate and the substrate, and the printing layer can be reduced.

Therefore, since an air layer can be prevented from being formed through the gap between the adhesive layer and the cover substrate, the adhesive strength can be prevented from being degraded, so that the adhesive strength between the cover substrate and the substrate can be improved.

Figure 19:
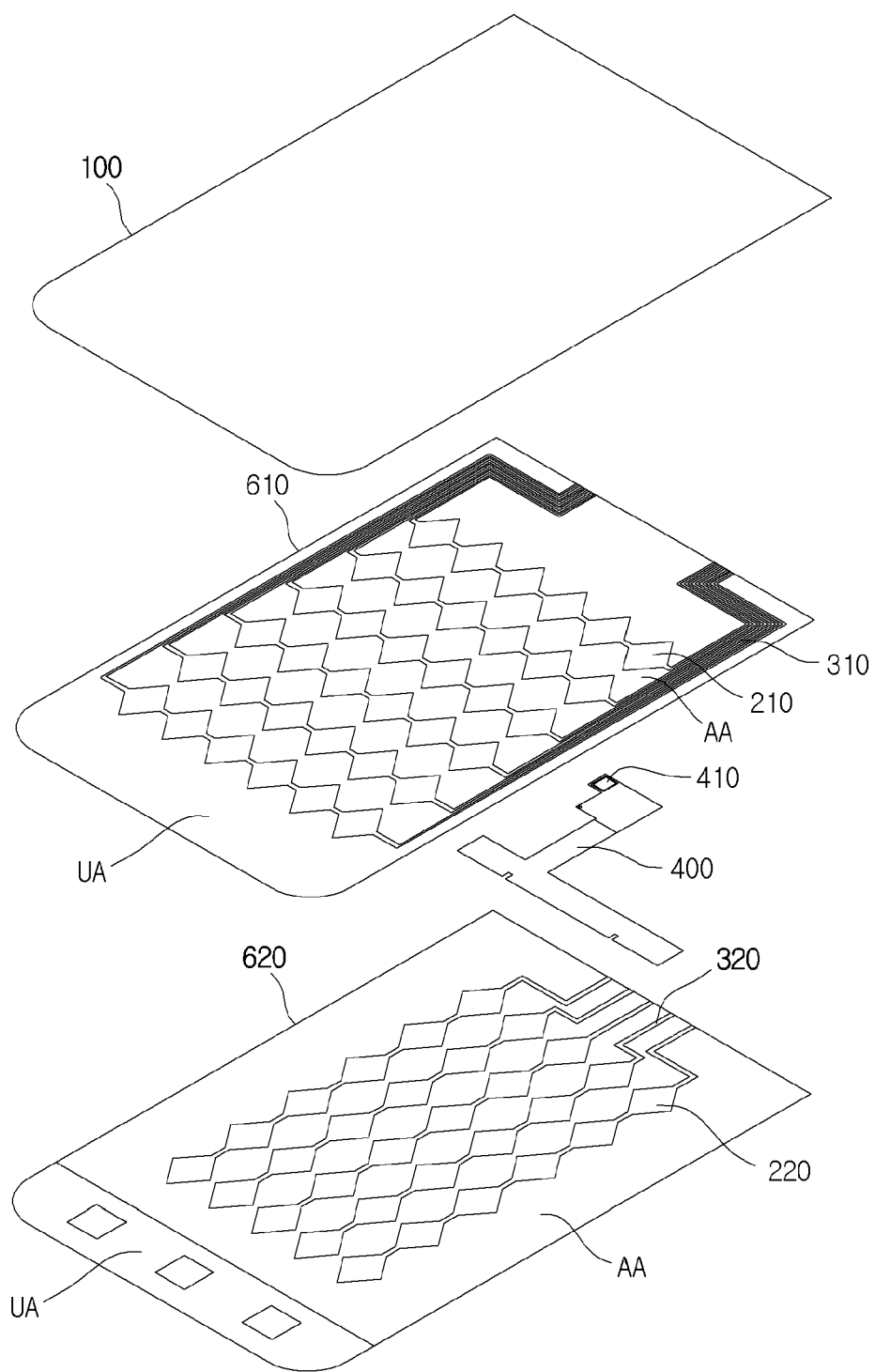

Referring to FIG. 19, a touch panel according to still another embodiment further includes first and second substrate 610 and 620 disposed on the cover substrate 100. The first and second substrates 610 and 620 may include plastic.

For example, the first and second substrates 610 and 620 may include PET. The cover substrate 100, the first substrate 610, and the second substrate 620 include active and inactive areas. The active and inactive areas have the same meanings as those described above.

The first sensing electrode 210 may be disposed in the active area of the first substrate 610. In addition, the first wire electrode 310 connected to the first sensing electrode 210 may be disposed in the inactive area of the first substrate 610.

In addition, the second sensing electrode 220 may be disposed in the active area of the second substrate 620. In addition, the second wire electrode 320 connected to the second sensing electrode 220 may be disposed in the inactive area of the substrate 600.

In addition, the first and second wire electrodes 310 and 320 may be electrically connected to the printed circuit board 400.

According to the touch panel of still another embodiment, the adhesive strength between the cover substrate and the substrate can be improved. In detail, the step difference between the printing layers of the cover substrate can be reduced. Accordingly, in order to bond the substrate onto the cover substrate, the gap resulting from the step difference between the adhesive layer, which is disposed between the cover substrate and the substrate, and the printing layer can be reduced.

Therefore, since an air layer can be prevented from being formed through the gap between the adhesive layer and the cover substrate, the adhesive strength can be prevented from being degraded, so that the adhesive strength between the cover substrate and the substrate can be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a cover substrate comprising an active area and an inactive area;
a printing layer only on the inactive area;
a wire electrode on the printing layer; and
a sensing electrode connected with the wire electrode;
wherein the printing layer comprises:
a first printing layer, and
a second printing layer on a top surface and a lateral surface of the first printing layer;
wherein a lateral side of the second printing layer has an average inclination angle in a range of about 1.5° to about 2.7° with respect to a top surface of the cover substrate,
wherein the lateral side of the second printing layer comprises a curved surface,
wherein the wire electrode is on the second printing layer,
wherein the second printing layer has a conductive area, and
wherein the sensing electrode is in direct physical contact with the wire electrode in the conductive area; and
the touch panel further comprising a passivation layer on the wire electrode and on the top surface of the second printing layer.

2. The touch panel of claim 1, wherein an average height from the top surface of the cover substrate to a top surface of the second printing layer is in a range of about 10 μm to about 14 μm.

3. The touch panel of claim 1, wherein at least one of the first and second printing layers is, semi-transparent, or opaque.

4. The touch panel of claim 1, further comprising a reinforcing printing layer on the second printing layer,
wherein the reinforcing printing layer is on at least one of the top surface and the lateral side of the second printing layer, and wherein the wire electrode and the passivation layer are on the reinforcing printing layer, and
wherein the reinforcing printing layer is a different color than the first and second printing layer.

5. The touch panel of claim 1, wherein the sensing electrode comprises first and second sensing electrodes on the active area, wherein the first and second sensing electrodes are on a same surface of the cover substrate.

6. A touch panel comprising:
a cover substrate comprising an active area and an inactive area;
a printing layer only on the inactive area;
a wire electrode on the printing layer; and
a sensing electrode connected with the wire electrode;
wherein the printing layer comprises,
a first printing layer;
a second printing layer on the first printing layer, and
a third printing layer on a top surface and a lateral surface of at least one of the first and second printing layers;
wherein a lateral side of the third printing layer has an average inclination angle in a range of about 1.7° to about 2.9° with respect to a top surface of the cover substrate,
wherein the lateral side of the third printing layer comprises a curved surface,
wherein the wire electrode is on the third printing layer,
wherein the third printing layer has a conductive area, and
wherein the sensing electrode is in direct physical contact with the wire electrode in the conductive area; and
the touch panel further comprising a passivation layer on the wire electrode and on the top surface of the third printing layer.

7. The touch panel of claim 6, wherein the third printing layer is on the top surface and the lateral surface of the second printing layer.

8. The touch panel of claim 7, wherein the third printing layer is on the top surface and the lateral surface of the first printing layer.

9. The touch panel of claim 6. wherein an average height from the top surface of the cover substrate to a top surface of the third printing layer is in a range of about 15 μm to about 20 μm.

10. The touch panel of claim 6, wherein at least one of the first to third printing layers is semi-transparent, or opaque.

11. The touch panel of claim 6, further comprising a reinforcing printing layer on the third printing layer, wherein the reinforcing printing layer is on at least one of the top surface and the lateral side of the third printing layer, and wherein the wire electrode and the passivation layer are on the reinforcing printing layer, and wherein the reinforcing printing layer is a different color than the first, second, and third printing layers.

12. The touch panel of claim 6, wherein the sensing electrode comprises first and second sensing electrodes on the active area, and wherein the first and second sensing electrodes are on a same surface of the cover substrate.

13. The touch panel of claim 1, wherein the wire electrode is on the second printing layer, and wherein the sensing electrode is interposed between the first and second printing layers.

14. The touch panel of claim 1, wherein the sensing electrode is on the second printing layer, and wherein the wire electrode is interposed between the first and second printing layers.

* * * * *